United States Patent [19]

Daily

[11] Patent Number: 5,316,129
[45] Date of Patent: May 31, 1994

[54] CERAMIC CONVEYOR ROLL HAVING FLAT-SIDED SPRING RETAINER FOR NON-ROTATABLY MOUNTING END CAPS TO ROLLER

[75] Inventor: Alan W. Daily, Darlington, Pa.

[73] Assignee: Vesuvius Crucible Company, Wilmington, Del.

[21] Appl. No.: 24,779

[22] Filed: Mar. 2, 1993

[51] Int. Cl.⁵ ............................................. B65G 13/02
[52] U.S. Cl. ................................. 198/780; 198/790; 432/236
[58] Field of Search ............... 198/780, 790; 432/236, 432/246; 403/372, 376; 29/450; 492/47; 65/185, 245, 253

[56] References Cited

U.S. PATENT DOCUMENTS

| | | | |
|---|---|---|---|
| 2,950,097 | 8/1960 | Tohir | 432/246 |
| 3,807,982 | 4/1974 | Classen et al. | 198/780 X |
| 4,242,782 | 1/1981 | Hanneken et al. | 432/236 X |
| 4,925,014 | 5/1990 | Haite | 198/780 |

FOREIGN PATENT DOCUMENTS 2707907 8/1977 Fed. Rep. of Germany ...... 432/236

*Primary Examiner*—James R. Bidwell
*Attorney, Agent, or Firm*—Sixbey, Friedman, Leedom & Ferguson

[57] ABSTRACT

A conveyor roll for conveying heated glass sheets along a conveyor assembly is provided that comprises a fused silica roller having opposing cylindrical ends, a pair of end caps formed from a machinable steel which may be heat resistant for rotatably mounting the ceramic roller within a conveyor assembly, wherein each end cap has a tubular wall for receiving and surrounding one of the cylindrical ends of the roller, and a spring retainer for non-rotatably mounting each of the end caps to the roller. Each spring retainer includes a coil spring formed from flat sided coils helically wound around a cylindrical end of the roller, each of which coils includes bent portions and straight portions for resiliently and frictionally inter-engaging the tubular wall of the cap and the cylindrical end of the roller, respectively, despite the thermal differential expansion that occurs between the tubular wall of the cap and the cylindrical end of the roller as the roll is exposed to elevated temperatures. Each end cap includes a screw thread around its open end that threadedly engages the coils of the retainer spring and axially secures the end cap to its respective cylindrical roller end.

25 Claims, 2 Drawing Sheets

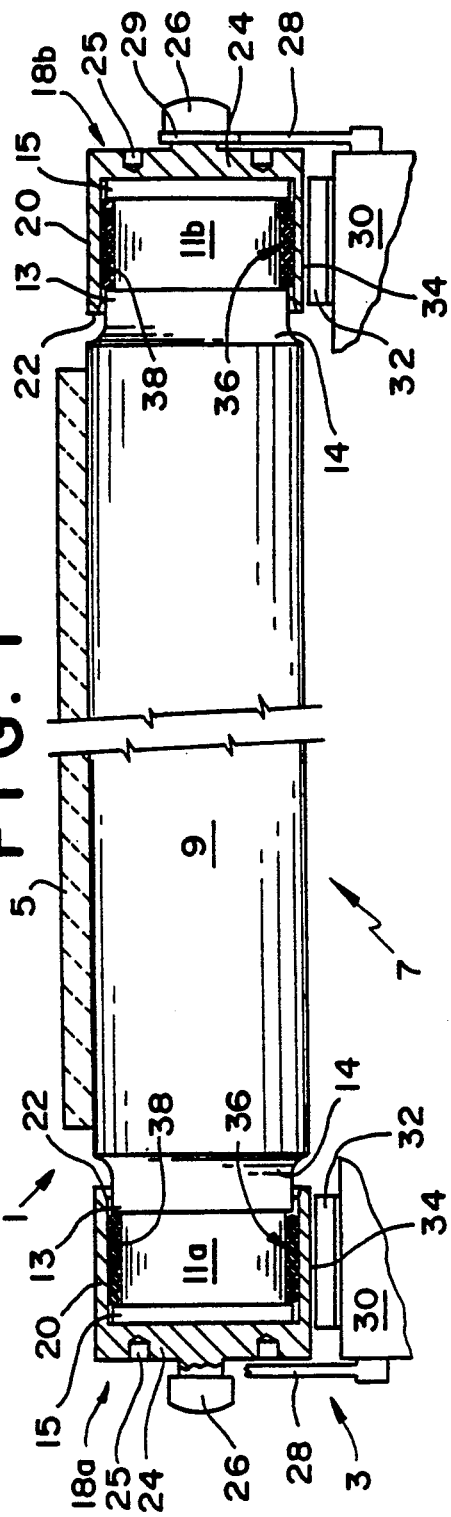
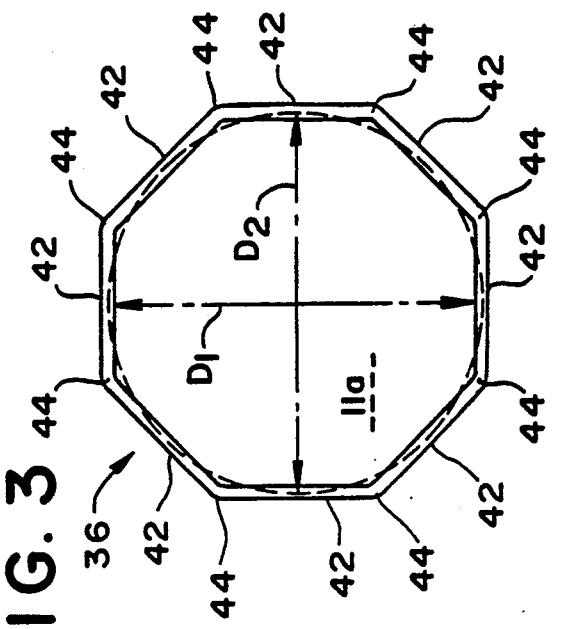
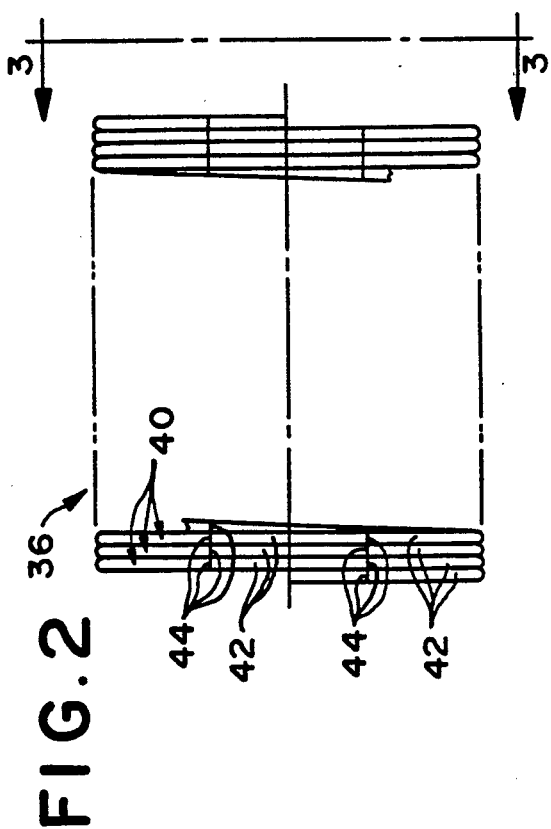

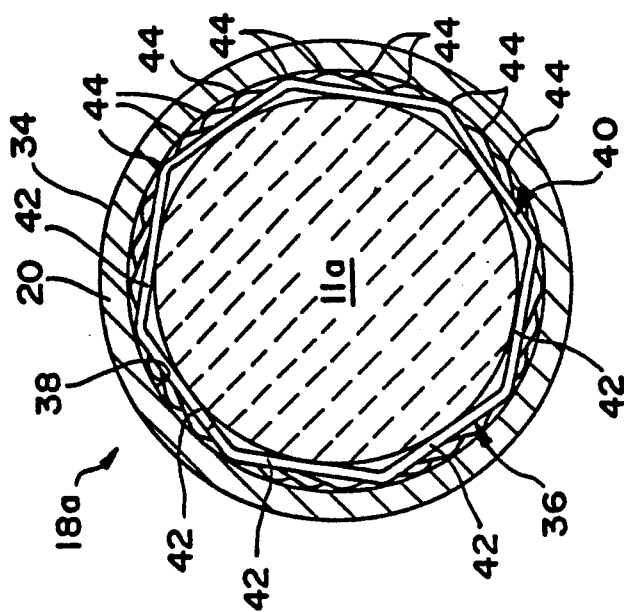
FIG. 5
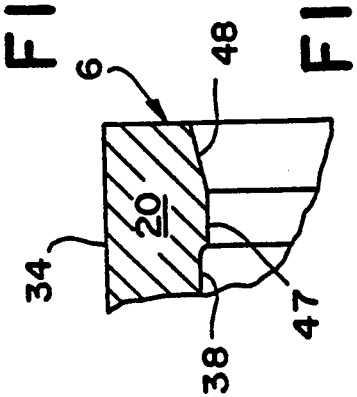
FIG. 7
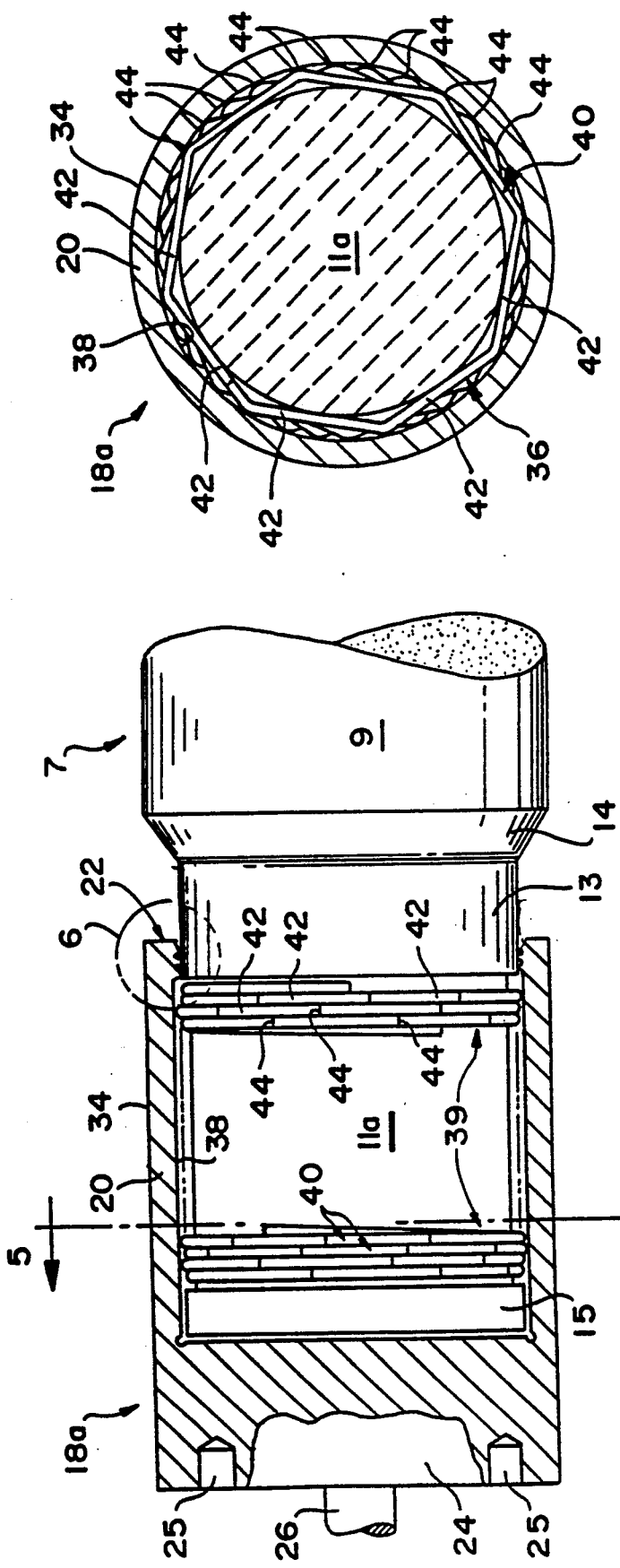
FIG. 4
FIG. 6

CERAMIC CONVEYOR ROLL HAVING FLAT-SIDED SPRING RETAINER FOR NON-ROTATABLY MOUNTING END CAPS TO ROLLER

BACKGROUND OF THE INVENTION

This invention generally relates to conveyor rolls, and is specifically concerned with the use of a flat sided coil spring retainer for non-rotatably mounting end caps to a ceramic roller member.

In glass sheet tempering systems, a conveyor mechanism having a plurality of elongated, ceramic rolls is used to convey glass sheets in and out of the heating chamber of a furnace. Such rolls are generally formed from fused silica whose ends are rotatably driven and supported by the conveyor mechanism. In order to transmit the driving torque from the conveyor mechanism to the ceramic roll, a pair of metallic end caps are non-rotatably mounted on either end of the roller member. In one type of conveyor system, each metallic end cap includes a short stub axle which is concentrically aligned with the axis of rotation of its respective end cap. The stub axles of the end caps are rotatably received within U-shaped members present on the upper ends of a pair of opposing support arms of the conveyor mechanism. A drive belt under one or both of the opposing end caps imparts a drive torque on the roller member which allows it to rollingly convey a sheet of heated glass. In other types of conveyor systems, stub axles may not be present on the end caps, and the end caps may be driven by gear trains or chains.

However, regardless of the type of conveyor system the conveyor roll works in combination with, each of the metallic end caps must be non-rotatably mounted to its respective end of the roller member so that the torque generated by the drive member of the conveyor mechanism is effectively transmitted to the ceramic roller. Any slippage between the end caps and the ends of the ceramic roller member would substantially impair the operation of the conveyor roll in transporting the glass sheets. Hence, there has been a long felt need for a simple, economical and effective means for non-rotatably attaching the torque-transmitting metallic end caps to the ends of the ceramic roller members used in such rolls.

Unfortunately, the thermal environment that such conveyor rolls must operate in, in combination with the thermal and mechanical properties of the materials used in such rolls, has frustrated the development of a truly satisfactory retention means between the end caps and the roller members. When such rolls are subjected to the operating temperatures associated with glass sheet tempering systems (i.e., between 500° and 1000° C.), the end caps may reach temperatures approaching 500° C. or more. The thermal expansion induced in the metallic end caps under such temperatures is much greater than the amount of expansion induced in the cylindrical ends of the roller member which are disposed within such caps. Consequently, a substantial mechanical loosening will occur between the caps and the ends of the roller member if the end caps are merely frictionfitted onto the cylindrical ends of the roller member. If such loosening becomes severe enough, the affected roller may become a "dead roll" which scrapes and damages the surface of the taffy-like, heated glass as it is pushed along the conveyor mechanism by the driving force imparted by the other driven rolls. While it would seem, at first blush, that the retention problem would be solved simply by mechanically interconnecting the end caps to the roller by means of screws, clamps, pins, or other conventional fasteners, the difficulty of machining bores, threads, or other recesses in the brittle silica roller members, in combination with the localized stresses that such mechanical fasteners impose on the silica rollers, disadvantageously results in localized cracking.

Accordingly, a number of alternative approaches have been attempted in the prior art to effectively interconnect the end caps with the rollers in ways which will avoid the creation of crack-inducing stresses on the roller ends. In one such approach, a heat-resistant silicon-based adhesive is applied between the cylindrical outer surface of the roller ends, and the inner surfaces of the tubular walls of such end caps. Unfortunately, the silicon-based adhesive must be periodically replaced in such conveyor rolls, as it breaks down over time. A more promising approach has been the utilization of spring-like members between the end caps and the ends of the roller member that continuously apply a frictional retaining force between these two elements. Such an approach is exemplified in McMaster U.S. Pat. No. 4,404,011 which utilizes a plurality of adjacent leaf spring members, as well as in the Page U.S. Pat. No. 4,399,598, which utilizes circumferentially expandable and radially compressible split metal rings.

While both of these approaches appears to be an advance over the use of presently known silicon-based adhesives, neither of these approaches is without its shortcomings. For example, neither of the retaining approaches disclosed in either the McMaster '011 or Page '598 patents provides any means for positively preventing the end caps from axially sliding off the ends of their respective roller member. This is important, as the axial slippage of such an end cap from a roller during the operation thereof could result in the creation of either a "dead roll", which scrapes the surface of the softened glass, or a roll which rotates eccentrically and causes unwanted, optically distortive variations in the thickness of the glass. Additionally, the split metal rings utilized as the retaining element in the Page '598 patent would not appear to be capable of applying a strong retaining force between the roller member and the inner surface of the tubular wall of the end caps when the end caps had thermally expanded, unless the corrugations in the split rings were dimensioned in the radial direction such that they applied a very high wedging force when the end cap was slid over its respective roller end during the assembly thereof under ambient temperature conditions. While the radially compressive forces would probably relax when the roll became heated during use, the application of such large, radially compressive forces during assembly could apply localized stresses on the ends of the roller which could result in micro cracking or other damage. Additionally, in order to install the roller member in end caps having such split rings in their interiors, it may be necessary to axially force the end caps into the roller, which in turn applies even more potentially stressful forces in the brittle material forming the roller. Finally, the relatively large gap between the free edge of the end caps and the cylindrical body of the ceramic roller member present in the Page '598 design invites the accumulation of dust and debris between the end caps, the split rings and the ceramic roller member when the roller member is in use. Such accumulation could ultimately impose unwanted stresses on the roller ends when the end caps and the metal split rings cooled and contracted over the roller ends when the glass heating furnace was turned off. While the use of eight flat leaf springs as shown in the McMaster '011 patent could well provide a retaining means which avoids some of the aforementioned shortcomings associated with the design of the Page '598 end cap retainer, the fact that the side edges of the leaf springs are not mechanically interconnected could allow these springs to circumferentially shift during the operation of the roll, which in turn could result in a non-concentric retention of the roller end within the tubular wall of the end cap. Such a non-concentric retention could cause the roll to rotate eccentrically. Additionally, the assembly of this particular device is relatively difficult and awkward, as temporary circumferential clamps must be used to squeeze the leaf springs together around the end of the roller member before the end cap can be slid over the springs.

Clearly, there is a need for a retaining means that positively secures the end caps of a conveyor roll to the ends of its respective roller member not only in the circumferential direction, but in the axial direction as well. Ideally, such a retaining means should positively retain the roller to the end caps despite the highest levels of thermal differential expansion, and should further be relatively easy to assembly without the imposition of large mechanical stresses onto the roller ends. Finally, it would be desirable if such a retaining means were relatively inexpensive to manufacture, highly reliable in performance, and durable in operation.

SUMMARY OF THE INVENTION

Generally speaking, the invention is a ceramic conveyor roll having a spring retainer for non-rotatably mounting end caps to the roller which overcomes or at least ameliorates all of the aforementioned shortcomings associated with the prior art. The inventive conveyor roll comprising a ceramic roller member having at least one cylindrical end, a metallic end cap for rotatably mounting the roller member within a conveyor assembly, the cap having a tubular wall for receiving and surrounding the cylindrical end of the roller, and a retaining means for non-rotatably mounting the cap to the roller member which includes a coil spring helically around the cylindrical end of the roller member that has a plurality of interconnecting angular portions along its coils for resiliently and frictionally inter-engaging the annular wall of the cap and the cylindrical end of the roller member. Such frictional inter-engagement is maintained despite the thermal differential expansion that occurs between the cap and the roller end when it is exposed to temperatures between ambient, and 1000° F.

The angular portions of the coils of the spring may include bent portions that engage the annular wall of the cap, and straight portions that engage the cylindrical end of the roller member. In the preferred embodiment, the sides of the coils of the spring define convex, polygonally-shaped figures, such as octagons. The minimum diameter of the coils of the spring retainer is slightly less than the outer diameter of the cylindrical ends of the roller member so that the straight and bent portions of the adjacent coils do not line up with one another, but rather assume a staggered or offset relationship. Each cylindrical end of the ceramic roller member is bounded by annular shoulders for capturing the coil spring and thereby preventing relative axial movement between the coil spring and the roller member. Additionally, the annular wall of the end cap terminates in a free edge which may have a means for axially securing the end cap onto the roller member. In the preferred embodiment, the axial securing means is a screw thread which threadedly engages the coils of the spring when the end cap is rotated relative to the cylindrical end of the roller member incident to an assembly operation. The pitch of the screw thread is preferably opposite to the pitch of the coil spring so that the coils of the spring become more tightly wound when the thread of the cap is screwed over the spring coils. The inner diameter of the screw thread of the axial securing means is preferably 10-20 thousandths of an inch from the annular shoulder which the screw thread faces after the end cap has been completely screwed over the coil spring. Such close dimensioning prevents most dust and other debris from entering the space between the annular wall and the cylindrical end which could interfere with the operation of the coil spring retaining means disposed therebetween.

Finally, the roller member of the conveyor roll is preferably formed from fused silica, while the end cap is formed from a machinable steel, such as alloy 4140 or Ledloy 300. Additionally, the outer diameter of each of the end caps is preferably the same as the outer diameter of the central portion of the ceramic roller.

BRIEF DESCRIPTION OF THE SEVERAL FIGURES

FIG. 1 is side view of the conveyor roll of the invention as it would appear in operation installed within a conveyor mechanism of a glass tempering system, wherein both the end caps and the retaining spring have been shown in cross section for purposes of clarification;

FIG. 2 is a side view of the flat sided, octagonal spring retainer used to mechanically couple the tubular wall of each of the end caps with the cylindrical ends of the ceramic roller member;

FIG. 3 is an end view of the spring retainer illustrated in FIG. 2 along the line 3—3;

FIG. 4 is an enlarged, partial side cross sectional view of the conveyor roll of the invention, illustrating how the octagonal spring retainer inter-engages the cylindrical end of the ceramic roller member and the interior surface of the tubular wall of the end cap;

FIG. 5 is a cross-sectional view of the end of the conveyor roll illustrated in FIG. 4 along the line 5—5;

FIG. 6 is an enlargement of the area enclosed by the dotted circle in FIG. 4, illustrating the screw threads in the annular ledge that circumscribes the free end of the tubular wall of the end cap, and FIG. 7 illustrates how the area enclosed by the dotted circle in FIG. 4 would appear prior to the machining of screw threads in the annular ledge.

DETAILED DESCRIPTION OF THE PREFERRED EMBODIMENT

With reference now to FIG. 1, wherein like reference figures designate like components throughout all the several figures, the conveyor roll 1 of the invention is particularly adapted for use in a conveyor mechanism 3 that forms part of a system for heat tempering system for glass plates 5 at elevated temperatures between 500° and 1000° C. The largest single component of the conveyor roll 1 is a fused silica roller member 7. The roller member 7 includes a broad, central portion 9 which, in operation, rollingly conveys hot glass sheets 5 as shown from into and out of the furnace chamber (not shown) of the tempering system. Disposed at either end of the central roller portion 9 are cylindrical end portions 11a,b. Each of these portions 11a,b are roughly bobbin-shaped, including a proximal annular shoulder 13 and a distal annular shoulder 15 which circumscribes their inner and outer ends, respectively. The proximal annular shoulder 13 leads into a flared portion 14 which integrally connects the end portions 11a,b with the ends of the central roller portion 9 as shown.

Disposed around either of the cylindrical end portions 11a,b of the roller member 7 are end caps 18a,b respectively. In the preferred embodiment, each of these end caps is preferably formed from a machinable steel, such as Ledloy 300 or its equivalent. Each of the end caps 18a,b includes a tubular wall 20 which circumscribes its respective cylindrical end portion 11a,b. The tubular wall 20 of each end cap includes a free edge 22 that defines an open end in the cap for receiving its respective cylindrical end portion, as well as an integrally-formed end wall 24 on its other end as shown. A pair of opposing bores 25 are included in the end wall 24 of each of the end caps 18a,b for receiving the prongs of a wrench for assembly purposes. The circular end wall 24 of each of the end caps 18a,b includes a stub shaft 26 which projects outwardly from the wall 24 as shown. The axis of rotation of each of these stub shafts 26 is concentrically aligned with the axis of rotation of its respective end wall 24. When the conveyor roll 1 is installed onto the conveyor mechanism 3, the stub shaft 26 of each of the end caps 18a,b is rotatably received and retained within a U-shaped member 29 (shown only with respect to cap 18b) which in turn is connected to a shaft retaining arm 28. The shaft retaining arm 28 for both caps 18a,b is mounted on a support table 30. A drive belt is disposed between the support table 30 and the exterior surface 34 of the tubular wall 20 of each of the end caps 18a,b for the purpose of applying a drive torque to the roller member 7.

In order for the torque applied to the end caps 18a,b to be effectively transmitted to the roller member 7, each of the end caps 18a,b must be non-rotatably secured over its respective cylindrical end portion 11a,b. For this purpose, a flat-sided, coil spring retainer 36 is provided between the cylindrical end portions 11a,b and the interior surface 38 of the tubular wall 20 of each of the end caps 18a,b.

Turning now to FIGS. 2, 3 and 4, the flat-sided coil spring retainer 36 is formed a plurality of coils 40 which are preferably octagonal in shape, although other polygonal configurations could also be used. While each of the coils may be formed from ASTM grade A 228 piano wire that is between 0.031 and 0.032 inches diameter, these coils are more preferably formed from a heat resistant alloy, such as Inconel. Each of the coils 40 is formed from straight sections 42 of wire that are integrally interconnected by the bent portions 44, as best seen in FIGS. 2 and 3. With specific reference to FIG. 3, the minimum inner diameter D1 of the coils 40 are slightly smaller than the outer diameter D2 of each of the cylindrical end portions 11a,b. Such dimensioning insures that when the coils 40 of the spring retainer 36 are wound around their respective cylindrical end portion 11a,b, that the frictional contact between the straight sections 42 and the bent portions 44 will not be linearly distributed parallel to the axis of rotation of the cylindrical end portions 11a,b, but rather will be uniformly distributed around the circumference of these portions, as may best be seen in both FIGS. 4 and 5. Note how in these FIGS. 4 and 5 how the bent portions 44 of adjacent coils 40 are not in linear alignment as they are when the octagon spring retainer 36 is in the relaxed state illustrated in FIG. 2, but rather are helically offset from one another as a result of the fact that the inner circumference of each of the coils 40 is slightly shorter than the outer circumference of the cylindrical end portion 11a,b that it circumscribes. Such a non-uniform distribution of both the straight sections 42 (which tangentially engage the outer surface of the cylindrical end portions 11a,b), and the bent portions 44 (which engage the interior surface 38 of the tubular wall 20 of each of the caps 18a,b) is believed to provide not only a more secure retaining force between the end caps 18a,b and their respective cylindrical end portions 11a,b, but also superior concentricity as the retaining forces are more uniformly distributed around the end portions 11a,b.

With reference now to FIGS. 4, 6, and 7, the free edge 22 of the tubular wall 20 of each of the end caps 18a,b is circumscribed, around its interior, by an annular ledge 47. Immediately in front of the annular ledge is a conical wall section 48. Preferably, the ledge 47 is circumscribed by a screw thread 49 whose pitch is twice that and opposite to the pitch of the helically arranged coils of the spring retainer 36. If the coils 40 of the spring retainer 36 define a right-handed screw thread, then the screw thread 49 around the annular ledge 47 should be a left-handed thread of the same pitch. The inner diameter of the screw thread 49 and the outer diameter of the proximal annular shoulder 13 are closely spaced together between about 10 and 20 thousandths of an inch. Such a close spacing prevents most dust and debris from collecting in the annular space between the tubular wall 20 and the cylindrical end portions 11a,b. When the roll 1 is in operation, the taper of the conical wall section 48 works in conjunction with the close spacing by centripetally throwing out any debris that attempts to lodge on it. While closer spacing is possible, the applicant has found that very fine particles of debris can become compacted in the resulting thin annular space between the inner diameter of screw thread 49 and the outer diamter of the proximal annular shoulder 13. Such compaction can result in large compressive stresses in this region of the roll 1 whenever the end caps 18a,b cool off and contract.

Turning now to a description of the assembly and operation of the conveyor roll 1 and with references again to FIGS. 4, 5, and 6, the end caps 18a,b are installed onto their respective cylindrical end portions 11a,b by first winding the coils 40 of an octagonal spring retainer 36 around the end portions 11a,b. Preferably, the length of the coils spring retainer 36 is dimensioned so that the spring retainer 36 covers substantially all of its respective cylindrical end portion, the ends of the spring retainer 36 being immediately adjacent to the proximal and distal annular shoulders 13 and 15 after the winding of the coil spring onto the end portions 11a,b has been completed. Because the inner circumference of the coils 40 is slightly less than the length of the outer circumference of the cylindrical end portions 11a,b, the straight sections 42 and bent portions 44 between adjacent coils 40 will assume the offset positioning illustrated in FIG. 4, as opposed to the linearly-aligned configuration shown in FIG. 2.

In the next step of the assembly of the roll 1, the distal end of the cylindrical end portions 11a are inserted through the open ends of the caps 18a,b through the open end defined by the free edge 22 until the threads 49 circumferentially engage the distal end of the coil spring retainer 36. Such engagement and alignment is facilitated by the conical wall 48. Next, the end caps 18a,b are screwed onto their respective cylindrical end portions 11a,b by applying the prongs of a wrench (not shown) into the prong receiving bores 25 on the end caps. In actual practice, the applicant has found that approximately 20 to 80 foot pounds of torque is necessary to screw the caps 18a,b into the positions illustrated in FIG. 1. However, the application of such torque to the ceramic roller member 7 poses no threat of breakage to the roller member 7, which typically can withstand over 400 foot pounds in torque without breaking. By virtue of the fact that the thread pitch between the screw thread 49 and the coils 40 of the spring retainer 46 are opposite from one another, the act of screwing the end caps 18a,b into the positions illustrated in FIGS. 1 and 4 actually serves to tighten the coils 40 of the spring retainer 36 around the outer surface of the cylindrical end portions 11a,b, thus enhancing the resulting retaining force. Additionally, the threaded engagement between the coils 40 of the spring retainer 36 and the threads 49, axially secures the caps 18a;b to the end portions 11a,b in combination with the presence of the annular shoulders 13 and 15.

As the result of the threading operation, the straight sections 42 and bent portions 44 of each of the coils 40 of the spring retainer 36 assume the positions illustrated in FIG. 5 to apply a retaining force that non-rotatably mounts the cylindrically end portions 11a,b to the end caps 18a,b. Specifically, the center portions of each of the straight sections 42 tangentially engage the outer surface of the cylindrical end portions 11a,b, while the bent portions 44 engage the interior surface 38 of the tubular wall 20 of the end caps 18a,b. In response to the radially compressive forces that the screw thread 49 applies to the coils 40 of the spring retainer 36, the straight sections 42 do not remain perfectly straight, but rather become bent slightly toward the cylindrical ends 11a,b as shown. Such bending of the straight sections 42 creates a two-way, compressive radial force which tightly engages the center portions of each of the bent portions 44 against the cylindrical end portions 11a,b, and which further and compressively engages the bent portions 44 of the coils 40 against the interior surface 38 of the tubular wall 20. The applicant has found that when the inner diameter of the screw thread 49 and the outer diameter of the threads defined by the coils 40 require torques of between about 23 and 45 foot pounds to screw the end caps 18a,b into the positions shown in FIGS. 1 and 4, it takes approximately 20 to 70 foot pounds of relative torque between the end caps 18a,b and their respective cylindrical end portions 11a,b to create any relative rotational motion between these two components. Such a retention force is ample for the operation of the roll 1, as the transmission of no more than about 10 to 15 foot pounds of torque through the end caps 18a,b is usually required.

Advantageously, the applicant believes that when the end caps 18a,b are exposed to elevated temperatures up to 600° C., that the aforementioned retaining forces will increase or at least stay the same as a result of the way in which the resulting thermal expansion will effect the engagement of the coils 40 of the spring retainer 36 between the end caps 18a,b and the cylindrical ends 11a,b. As has been mentioned earlier, under such elevated temperature conditions the tubular wall 20 of the end caps will radially expand more than the cylindrical ends 11a,b of the roller member 7, since the end caps are formed from metal and the roller ends are formed from silica. However, the application of heat to the coils 40 of the spring retainer 36 will cause not only the diameter of the wire which forms the coils to expand, but expands the length of the straight sections 42 of the coils 40 to an even greater extent, as the length of the straight sections 42 is far greater than the diameter of the wire used to form the coils 40. The net effect of the thermal expansion of the coils 40 in these two directions insures that the retaining force applied by these coils will at least remain the same as the radial gap between the inner surface 38 of the tubular wall 20 and the outer surface of the cylindrical end portion 11a,b increases with temperature.

While the invention has been described with respect to a preferred embodiment, numerous modifications, additions, and variations will become evident to a person of ordinary skill in the art. All such additions, variations, and modifications are intended to fall within the scope of this invention, which is confined only by the scope of the attached claims.

I claim:

1. A conveyor roll for conveying articles at elevated temperatures, comprising:
   a ceramic roller member having at least one cylindrical end;
   a metallic end cap for rotatably mounting said roller member within a conveyor assembly, said cap having a tubular wall for receiving and surrounding said cylindrical end of said member, and
   a retaining means for non-rotatably mounting said cap to the roller member, including a coil spring helically wound around said cylindrical end of said roller member and having a plurality of interconnecting angular portions along its coils for resiliently and frictionally inter-engaging the tubular wall of the cap and the cylindrical end of the roller member despite thermal differential expansion between said cap and roller member between ambient and elevated temperatures.

2. The conveyor roll of claim 1, wherein said coils include bent portions that engage the tubular wall of the cap and straight portions that engage the cylindrical end of the roller member.

3. The conveyor roll of claim 2, wherein the sides of the coils of said spring define convex, polygonally shaped figures formed from interconnecting straight sections of spring material.

4. The conveyor roll of claim 2, wherein the coils of said spring are octagon shaped, and wherein the vertices of the octagon-shaped coils engage the tubular wall of the cap, and the straight sides of the octagon-shaped coils engage the cylindrical end.

5. The conveyor roll of claim 1, wherein said roller member is formed from fused silica and said end cap is formed from a low carbon steel.

6. The conveyor roll of claim 1, wherein said cylindrical end is bounded by annular shoulders for preventing relative movement between the coil spring and the cylindrical end along the axis of rotation of the cylindrical end.

7. The conveyor roll of claim 1, wherein said coil spring is formed from a heat resistant metal.

8. The conveyor roll of claim 1, wherein the tubular wall of said end cap includes a free edge having a means for axially securing said end cap onto the cylindrical end of said roller member.

9. The conveyor roll of claim 8, wherein said axial securing means is a screw thread for threadedly engaging the coils of said spring when the end cap is rotated relative to said cylindrical end of said roller member.

10. The conveyor roll of claim 9, wherein the screw thread of the axial securing means is opposite in pitch from the pitch of said coil spring such that the coils of said spring become more tightly wound around said cylindrical end when said screw thread engages said coils.

11. A conveyor roll for conveying heated articles along a conveyor assembly, comprising:
a ceramic roller member having opposing cylindrical ends;
a pair of metallic end caps for rotatably mounting said ceramic roller member within said conveyor assembly, each of said caps having a tubular wall for receiving and surrounding one of said cylindrical ends of said roller member, and
a pair of retaining means for non-rotatively mounting each of said caps to the roller member, each of said retaining means including a coil spring helically wound around a cylindrical end of said roller member, wherein each of the coils of said spring includes interconnecting angular portions for resiliently and frictionally inter-engaging the surrounding tubular wall of an end cap and the cylindrical end of the roller member despite thermal differential expansion between said cap and roller member betwen ambient and elevated temperatures.

12. The conveyor roll of claim 11, wherein the sides of the coils of said spring define convex, polygonally shaped figures whose straight sections are all the same length, and which intersect with adjacent straight sections at substantially the same angle and wherein said bent portions are defined by the intersections of said straight coil sections.

13. The conveyor roll of claim 11, wherein said ceramic roller member is formed from fused silica, and said end cap is formed from a machinable steel.

14. The conveyor roll of claim 12, wherein the inner diameter of said coil spring is smaller than the outer diameter of said cylindrical end of said roller member, so that the inner diameters of the coils of said spring frictionally grasp the outer surface of said cylindrical end, and so that said intersections of said straight sections are distributed around all points of the circumference of the cylindrical end.

15. The conveyor roll of claim 11, wherein the coils of said spring are octagon shaped, and wherein the vertices of the octagon-shaped coils engage the tubular wall of the cap, and the straight sides of the octagon-shaped coils engage the cylindrical end.

16. The conveyor roll of claim 11, wherein said cylindrical end is bounded by annular shoulders for preventing relative movement between the coil spring and the cylindrical end along the axis of rotation of the cylindrical end.

17. The conveyor roll of claim 11, wherein the tubular wall of said end cap includes a free edge having an axial securing means including a screw thread for threadedly engaging the coils of said spring for axially securing said end cap onto said cylindrical end.

18. The conveyor roll of claim 17, wherein the pitch of the screw thread of the axial securing means and the pitch of the coils of said spring are opposite from one another so that said screw thread more tightly winds the coils of the spring around said cylindrical end when it threadedly engages said coils.

19. The conveyor roll of claim 17, wherein said cylindrical end is bounded by a distal and a proximal annular shoulder for preventing relative movement between the coil spring and the cylindrical end along the axis of rotation of the cylindrical end.

20. The conveyor roll of claim 19, wherein the inner diameter of said screw thread is closely spaced around the outer diameter of said proximal annular shoulder between 10 and 20 thousandths of an inch to prevent dirt and debris from entering the space between the annular wall of the cap and the cylindrical end of the roller.

21. A conveyor roll for conveying heated glass sheets along a conveyor assembly, comprising:
a fused silica roller member having opposing cylindrical ends;
a pair of end caps formed from a heat resistant alloy for rotatably mounting said ceramic roller member within said conveyor assembly, each of which has a tubular wall for receiving and surrounding one of said cylindrical ends of said roller member, said tubular wall including a free edge having an axial securing means including a screw thread, and
a retaining means for non-rotatively mounting each of said caps to said roller member, including a flat sided coil spring formed from flat sided coils helically wound around a cylindrical end of said roller member, wherein the spring material forming said flat sided coils includes bent portions and straight portions for resiliently and frictionally interengaging the tubular wall of the cap and the cylindrical end of the roller member respectively, despite the thermal differential expansion that occurs between the cap and the cylindrical end as the roll is exposed to temperatures between ambient and 1000° F.,
wherein said screw thread of the free edge of each end cap threadedly engages the coils of said spring to axially secure said end cap onto said cylindrical end.

22. The conveyor roll of claim 21, wherein the pitch of the screw thread of the axial securing means and the pitch of the coils of said spring are opposite from one another so that said screw thread more tightly winds the coils of the spring around said cylindrical end when it threadedly engages said coils.

23. The conveyor roll of claim 22, wherein said cylindrical end is bounded by a distal and a proximal annular shoulder for preventing relative movement between the coil spring and the cylindrical end along the axis of rotation of the cylindrical end.

24. The conveyor roll of claim 23, wherein the inner diameter of said screw thread is closely spaced around the outer diameter of said proximal annular shoulder to prevent dirt and debris from entering the space between the annular wall of the cap and the cylindrical end of the roller member.

25. A retainer for non-rotatably mounting a metallic end cap to a cylindrical end of a ceramic roller member, wherein said cap has a tubular wall for receiving and surrounding the cylindrical end of the roller member, comprising a coil spring helically wound around said cylindrical end of said roller member and having a plurality of interconnecting angular portions along its coils for resiliently and frictionally inter-engaging the tubular wall of the cap and the cylindrical end of the roller member despite thermal differential expansion between said cap and roller member between ambient and elevated temperatures.

* * * * *